United States Patent Office 3,431,230
Patented Mar. 4, 1969

3,431,230
ANTIPLASTICIZED POLYSULFONE ETHERS
Winston J. Jackson, Jr., and John R. Caldwell, Kingsport, Tenn., assignors to Eastman Kodak Company, Rochester, N.Y., a corporation of New Jersey
No Drawing. Filed Sept. 8, 1966, Ser. No. 577,839
U.S. Cl. 260—33.8      6 Claims
Int. Cl. C08g 23/00, 51/76

ABSTRACT OF THE DISCLOSURE

The process for increasing the stiffness of a polymer having the recurring unit

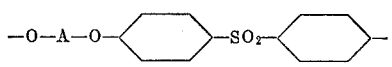

wherein A is the residue of a dihydric phenol, comprising blending therewith at least one antiplasticizing compound containing at least one polarizing constituent selected from the group consisting of halogen, oxygen, nitrogen and sulfur atoms, at least two nonbridged rings of 4–8 atoms, having in at least 65% of the length of its molecule one dimension of less than about 5.5 Angstrom units, and having a glass transition temperature greater than —50° C. Exemplary of the antiplasticizers are the chlorinated polynuclear hydrocarbons such as chlorinated biphenyl and terphenyl.

---

This invention relates to an improvement in thermoplastic compositions prepared for example, from dihydric phenols and dihalodiphenylsulfones, and particularly concerns poly-(sulfone ether) compositions which have been modified to increase particularly their moduli or stiffness, and also tensile strength and hardness.

For certain film applications, including magnetic tape base, photographic film base, and packaging material, relatively stiff films are required, that is, films with high tensile modulus. For certain fiber applications, including various types of fabrics for wearing apparel, drapery material, and upholstery relatively stiff fibers are required, that is fibers with a high tensile or elastic modulus. Likewise, high tensile or elastic modulus is desirable where the thermoplastic composition is molded into shaped objects.

The principal objects of the invention are: to provide new, highly useful poly(sulfone ether) compositions which can be transformed into film, fibers, and shaped objects having such properties, as high heat-distortion temperatures, high melting points, excellent hardness, and especially improved tensile moduli or stiffness; and to provide a commercially practical process for preparing such compositions and films, fibers, and shaped objects thereof.

These and other objects hereinafter appearing have been achieved in a general sense in accordance with the present invention through the discovery that these improved properties, particularly modulus, are obtained by forming compositions of the poly(sulfone ethers) modified with materials which will be referred to hereinafter as antiplasticizers. The antiplasticizers increase the modulus, tensile strength, and hardness of a thermoplastic composition and lower the elongation whereas a plasticizer decreases the modulus, tensile strength, and hardness of the thermoplastic composition and increases the elongation. In general, antiplasticizers which have been found to be effective for the present polymers are polar compounds which contains at least one atom selected from the group consisting of halogen, oxygen, nitrogen, and sulfur and wherein said polar compound contains at least two non-bridged rings containing from four to eight atoms wherein rings are either carbocyclic rings or heterocyclic rings, and wherein said polar compound has in at least 65% of the length of its molecule one dimension less than about 5.5 angstrom units, and wherein said polar compound has a glass transition temperature greater than —50° C. In general, the increase in modulus of a poly(sulfone ether) composition is obtained by providing a homogeneous mixture consisting of about 98% to about 50% and preferably from about 90% to about 70% by weight of a poly(sulfone ether) and from about 2% to about 50% and preferably between about 10% and about 30% by weight of the said polymer of the antiplasticizers of this invention. The resulting thermoplastic composition can then be extruded, solvent-cast into a film, spun into fibers or filaments, or molded into a shaped object. When compared to compositions containing no antiplasticizer according to this invention, the present compositions of this invention have higher moduli and increased tensile strengths. Suprisingly, the antiplasticizers substantially lower the molding temperature of the plastics by lowering the melt viscosities, without attendant reduction in hardness and tensile strength. This is particularly advantageous as it is difficult to injection mold such unmodified poly(sulfone ethers) because of the high temperatures required to achieve the necessary flow properties in a molding operation.

A more specific disclosure of the types of poly(sulfone ethers) which can be modified with antiplasticizers according to the present invention will be disclosed below. However, it will be understood that the following examples are included merely for purposes of illustration and are not intended to limit the scope of the invention unles otherwise specifically indicated.

The process of this invention is applicable to poly-(sulfone ethers) having the following recurring units:

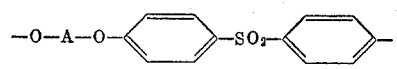

wherein A is the residue of a dihydric phenol. Such polymers are described in Netherlands application 6408130. Examples of dihydric phenols which may be used to prepare these polymers are 4,4'-isopropylidenediphenol (commonly called bisphenol A), 4,4-isopropylidenebis(2,6-dichlorophenol), 4,4'-isopropylidenebis(2,6-dimethylphenol), 4,4'-methylenediphenol, 4,4'-(phenylmethylene)diphenol, 4,4'-(cyclohexylmethylene)diphenol, 4,4'-cyclohexylidenediphenol, 4,4' - (2-norbornylidene)diphenol, 4,4'-(3-methyl-2-norbornylmethylene)diphenol, 4, 4'-(hexahydro-4,7-methanoindan-5-ylidene)-diphenol, 1,2-ethylenediphenol, 4,4'-dihydroxybiphenyl, 1,5-naphthalenediol, 5,6,7,8-tetrahydro-1,4-naphthalenediol, hydroquinone, 4,4'-sulfonyldiphenol, 4,4'-thiodiphenol, and 4,4'-oxydiphenol. Other such dihydric phenols are listed in U.S. 3,030,335, in Ind. Eng. Chem., 51, 157 (1959), and in our copending application Ser. No. 292,139, filed on July 1, 1963. Preferred dihydric phenols are those in which the hydroxyl groups are on separate aromatic rings. These are commonly called "bisphenols."

These polymers or copolymers may be prepared for example by reacting an alkali metal salt of the dihydric phenol with a 4,4'-dihalodiphenylsulfone. When the alkali metal is potassium and the dihydric phenol is a bisphenol, this reaction is as follows:

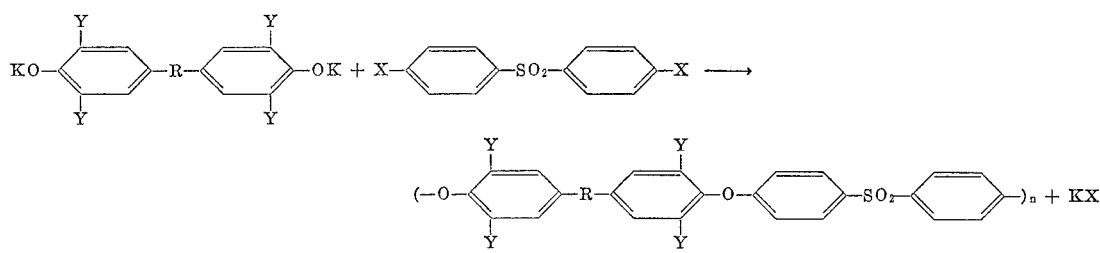

wherein X is chlorine or bromine, Y is a hydrogen atom, a halogen atom, or an alkyl group containing 1 to 4 carbon atoms, and R is a covalent bond or a hydrocarbon radical containing from 1–20 carbons. Preferably, R is either a covalent bond, an aliphatic radical containing 1–6 carbon atoms, an alicyclic radical containing 5–12 carbon atoms, a cycloaliphatic radical containing 5–20 carbon atoms, or a bridged-ring radical containing 7–16 carbon atoms.

Although the most preferred embodiment of the invention is where R derives its definition from the specifically aforementioned dihydric phenols, it is apparent that the present invention applies to all poly(sulfone ethers) derived from dihydric phenols including the metal salts thereof and diphenyl sulfones.

The polymerization reaction is carried out with equimolar amounts of the bisphenol alkali metal salt and the dihalodiphenylsulfone in dimethyl sulfoxide at 120 to 160° C. as described in Netherlands application 6,408,130. At the end of the polymerization (4 to 5 hr.), the solution is poured with stirring into water to precipitate the polymer, which is collected and dried.

The antiplasticizers which are incorporated into the poly(sulfone ethers) to give an increase in strength properties and in moduli are materials which, in general, are polar with a relatively high degree of rigidity. These materials may be polymeric or monomeric and, preferably, are nonvolatile, thus inhibiting migration of the antiplasticizer from the plastic composition. The antiplasticizer must, of course, be compatible with the poly(sulfone ether). Antiplasticizers which are soluble to the extent of at least 5% by weight in methylene chlorine at 20° C. are usually compatible with the polymer. Moreover, a film of the respective polymer compositions containing the antiplasticizers is clear and transparent when the antiplasticizer is compatible with the plastic.

In general, compounds which will serve as antiplasticizer for the present polymeric compositions of this invention are polar compounds which contain at least one atom selected from the group consisting of halogen, oxygen, nitrogen, and sulfur; they contain at least two non-bridged rings containing from 4 to 8 atoms wherein said rings are either carbocyclic or heterocyclic rings; they have in at least 65% of the length of the molecule one dimension less than about 5.5 Angstrom units, and they have a glass transition temperature greater than —50° C.

An indication of the rigidity of a molecule is given by its glass transition temperature. This may be determined for quenched, noncrystalline samples by differential thermal analysis, as described in J. Phys. Chem. 68, 1750 (1964). Quenching of the sample is achieved by heating above the melting point (if a solid) and then quickly cooling in liquid nitrogen. The glass transition temperatures of a number of additives are listed in Table 1, and it is significant that compounds with the lowest glass transition temperatures are plasticizers whereas those with the higher glass transition temperatures are antiplasticizers. The most effective antiplasticizers are the compounds with transition temperatures above —50° C. The effectivenes of the antiplasticizing action does not increase as the glass transition temperature increases, because the polarity and thickness of the molecule become the dominant factors.

TABLE 1. GLASS TRANSMISSION TEMPERATURES OF ADDITIVES

| Additive: | Glass transition temperature, ° C. |
| --- | --- |
| Di-n-octylphthalate | —87 |
| Diethylphthalate | —85 |
| Di(2-ethylhexyl)phthalate | —82 |
| Tri(o-cresyl) phosphate | —61 |
| Dibenzyl succinate | —58 |
| Abietic acid, methyl ester | —45 |
| Dicyclohexyl phthalate | —33 |
| Chlorinated biphenyl, 54% Cl | —29 |
| Hydrogenated abietic acid, triethylene gylcol ester | —28 |
| Diphenyl phthalate | —15 |
| Poly(styrene glycol), mol. wt. 500 | —10 |
| Chlorinated terephenyl, 42% Cl | 4 |
| Chlorinated terephenyl, 60% Cl | 55 |

The preferred classes of compounds which are within the above definition and have been found to be highly effective as antiplasticizers may be generally classified as follows:

(1) Polystyrene glycol
(2) Polystyrene thioglycol
(3) Chlorinated aromatic polynuclear hydrocarbons containing from 30% to 75% nuclear chlorine
(4) Esters of saturated and unsaturated abetic acid
(5) Abietyl alcohols, both saturated and unsaturated
(6) Esters of saturated and unsaturated abietyl alcohols.

Polystyrene glycol is intended to mean the diol of poly(phenylethylene oxide):

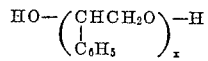

Polystyrene glycols having molecular weights from 378 to 3000 ($X=3–25$) are suitable as additives for improving the aforesaid properties of plastic materials according to this invention.

Polystyrene thioglycol is a polymer from phenylethylene sulfide. It has the structure:

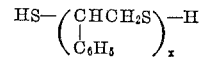

Thiglycol suitable for the invention range in molecular weight from 440 to 3400 ($X=3–25$).

Chlorinated aromatic polynuclear hydrocarbons containing 30% to 75% nuclear chlorine are excellent additives as antiplasticizers for polycarbonates or polyesters. This type is frequently preferred because the additive not only increases the modulus, but it may also provide fire-retardant properties. Types of aromatic polynuclear hydrocarbons which may be chlorinated for this purpose are diphenyl, the terphenyls (o, m, and p), naphthalene, phenanthrene, and anthracene. Also, chlorinated aromatic compounds with the following structures are effective:

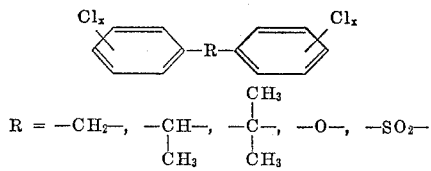

$$R = -CH_2-, -CH(CH_3)-, -C(CH_3)_2-, -O-, -SO_2-$$

and

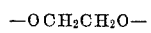

$-OCH_2CH_2O-$

Other antiplasticizers are the diabietates of aliphatic and cycloaliphatic diols containing from 2 to 20 carbon atoms. The aliphatic diols from which the diabietates are made may be straight-chain or branched. Aromatic or alicyclic groups may be present. Examples of these diols include 1,4-butanediols; 1,10-decanediols; 2,2-dimethylpropanediol; 2,2,4-trimethyl-1,3-pentanediol; 1,4-cyclohexanedimethanol; 1,4-alpha, alpha'-xylylenediol; 1,4-cyclohexanediol; 2,5-norcamphanediol. Ether linkages may be present, as represented in diethyleneglycol, and tetraethyleneglycol. Polyhydroxy compounds containing from 3 to 15 carbon atoms can be used, such as glycerol or pentaerythritol. Diabietates may be prepared from unsaturated abietic acid or from hydrogenated abietic acid. Technical grades of abietic acid and rosin acids can be employed in preparing the glycol esters.

Monoesters of abietic or hydrogenated abietic acids and monohydroxy alcohols containing from about 1 to 20 carbon atoms are also useful as antiplasticizers. Typical alcohols are methanol, 2-ethylhexanol, cyclohexanol, 2-norcamphanol, and benzyl alcohol.

Abietyl alcohol and hydrogenated abietyl alcohol are suitable antiplasticizers for this invention. Hydrogenation of abietic acid and abietyl alcohol reduces the two double bonds in the compounds.

Esters from unsaturated and hydrogenated abietyl alcohols and mono- and diesters obtained from these two alcohols and mono- and dicarboxylic acids are also suitable antiplasticizers. Many of these esters are available commercially. Monocarboxylic acids suitable for making these esters are those containing from about 1 to 20 carbon atoms. Aliphatic chains in the acids may be straight or branched. Aromatic or alicyclic groups may be present. Examples of the acids include acetic, 2-ethylhexanoic, cyclohexanecarboxylic, 2-normcamphanecarboxylic, benzoic, and phenylacetic. Ether linkages may be present, such as in phenoxyacetic acid. Straight-chain or branched dicarboxylic acids may be used which contain from about 2 to 20 carbon atoms. Aromatic or alicyclic groups may be present. Examples of these acids include adipic, dimethylmalonic, 1,4-cyclohexanedicarboxylic, isophthalic, and 2,5-norcamphanedicarboxylic. Ether linkages may be present, such as in diglycolic acid.

The preferred antiplasticizers are: (1) chlorinated biphenyls and terphenyls comprising from about 30% to 75% chlorine; (2) poly(styrene-glycols) having a molecular weight of about 378 to about 1500; and (3) esters from the condensation of monohydroxy and polyhydroxy alcohols with unsaturated and hydrogenated abietic acids; abietyl alcohol; hydrogenated abietyl alcohol; and mono- and diesters from condensation of unsaturated and hydrogenated abietyl alcohols with monocarboxylic and dicarboxylic acids having up to 19 carbon atoms.

The antiplasticizer is conveniently added to the polymer by adding it to the polymer dope. The polymer may be dissolved in solvents such as the halogenated hydrocarbons, e.g., chloroform, methylene chloride, etc. The antiplasticizer is added to the polymer dope and the resulting mixture may be used in that form for fabrication into various shaped articles, or alternatively, the dope may be evaporated to form dry polymer particles, which in turn, may be molded or extruded into various shaped articles. Films are normally made by conventional solvent-casting techniques in which the polymer dope is spread on a flat surface, the solvent is evaporated, and the resulting material is stripped away from the surface in the form of a self-supporting film. Fibers are conveniently made by dry-spinning the dope. For example, materials of this invention can be converted to fibers by dry spinning through a 30-hole (0.075 mm.) spinneret into a chamber at 60–100° C. followed by drafting. If the polymer mixture is sufficiently insoluble in convenient solvent, films and fibers may be fabricated by extruding a dry-blended mixture of the dry polymer and the antiplasticizer.

An alternative procedure when the polymer is to be melt-spun, extruded, or molded is to dissolve the antiplasticizer in a solvent which does not dissolve nor appreciably swell the polymer. The solution of antiplasticizer is added to particles of the polymer (10- to 20-mesh or smaller in size) and the solvent is evaporated, leaving the antiplasticizer as a deposit on the polymer particles. Suitable solvents which will dissolve the antiplasticizers but not the polymers include acetone, methanol, ethanol, hexane, naptha, and cyclohexane.

Films and fibers may be oriented by stretching or drafting to enchance their properties even beyond those provided by the presence of the antiplasticizers. The present polymers may be chrystalline or non-chystalline. In many applications, non-crystalline films are preferred because they are more transparent, while, on the other hand, crystalline fibers are frequently preferred because after drafting and heat-setting, they have higher tenacities and melting temperatures than non-crystalline fibers.

In addition to the preferred antiplasticizers previously mentioned, other antiplasticizers which illustrate out invention and fall within the above-mentioned antiplasticizer definition are structurally represented below.

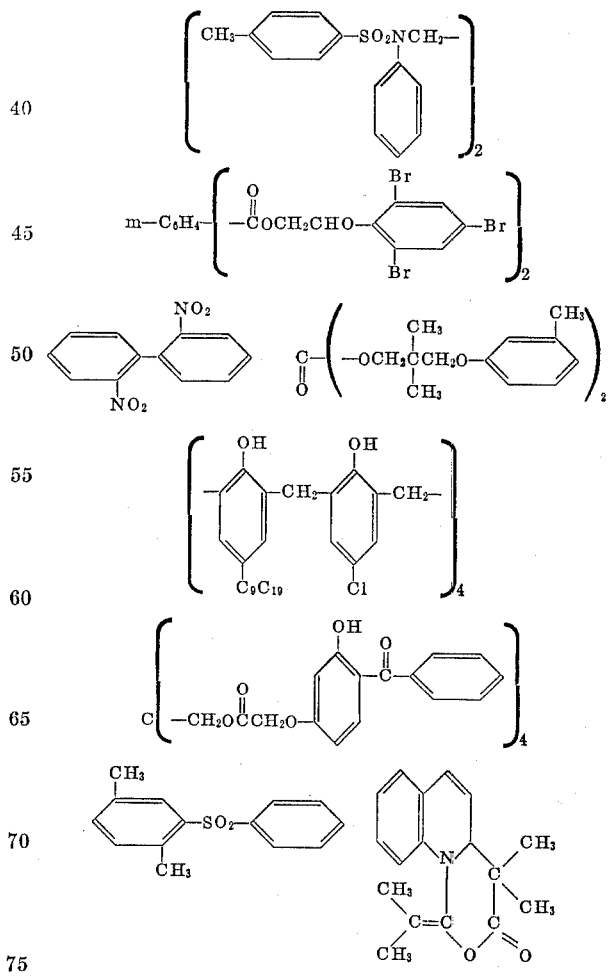

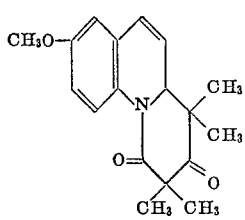
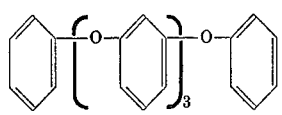

To further illustrate the invention, several experiments were carried out in which various ones of the present polymers were prepared and treated with many different antiplasticizers in different concentration ranges. The following examples are intended to be illustrative and not to be restrictive in any sense whatsoever.

Table 2 lists a number of film examples in which the polymer dopes were prepared by dissolving the polymer in methylene chloride and then adding the antiplasticizer. The dopes were coated with a doctor blade onto 9″ x 18″ glass plates, and the solvent was allowed to evaporate into the air at room temperature. The films of 1 to 2 mils in thickness were removed, allowed to stand at room temperature overnight, and then heated in an oven at 100° C. for 2 to 3 hr. to insure removal of all solvent. Tensile properties (tensile strength, modulus, and elongation) were measured in accordance with ASTM D882–61T Method A. Inherent viscosities were measured in chloroform at a concentration of 0.23 g./100 ml.

The poly(sulfone ethers) in Table 2 identified by letters, are obtained from the following bisphenols and 4,4′-dichlorodiphenylsulfone. The inherent viscosities (I.V.) of the polymers are also listed.

(A) 4,4′-isopropylidenediphenol (bisphenol A), I.V. 0.45.

(B) 4,4′-(2-norbornylidene)diphenol, I.V. 0.43.

(C) 4,4′-(hexahydro-4,7-methanoindan-5-ylidene)diphenol, I.V. 0.40.

(D) 4,4′-(cyclohexylmethylene)diphenol, I.V. 0.47.

polymers containing antiplasticizers also are obtained by melt-spinning by conventional methods.

As illustrated with poly(sulfone ether) A in Table 3, poly(sulfone ether) molding plastics containing antiplasticizers have increased flexural modulus (stiffness), yield strength, break strength, and hardness. Compositions containing the chlorinated additives are preferred because they are more resistant to burning. Also, the aromatic chlorinated compounds are more stable than some of the ester and glycol-type antiplasticizers at the high temperatures required for molding. The properties in Table 3 were determined on injection-molded specimens according to Standard ASTM Procedures (ASTM D1708–59T, D747–61T, and D785–51 Method A). The antiplasticizers dissolved in hexane were deposited on 10- to 20-mesh polymer particles of the poly(sulfone ether) in an evaporating dish by allowing the solvent to evaporate while the mixture was stirred and warmed gently. The particles were then stirred in a flask while heating in a bath at 100° C. for 2 hr. to remove last traces of solvent and permit the additive to penetrate the particles.

TABLE 3

| Antiplasticizer | | Wt. percent | Flexural modulus, $10^5$ p.s.i. | Yield strength, p.s.i. | Break strength, p.s.i. | Elongation at break, percent | Rockwell hardness, L |
|---|---|---|---|---|---|---|---|
| Name | | | | | | | |
| None | | 0 | 2.8 | 9,600 | 9,100 | 113 | 97 |
| Chlorinated biphenyl with 54% chlorine | | 10 | 4.3 | | 12,500 | 12 | 110 |
| Chlorinated terphenyl with 60% chlorine | | 20 | 4.5 | | 12,700 | 11 | 107 |
| Hydrogenated abietic acid, triethylene glycol ester | | 10 | 4.0 | | 11,300 | 10 | 105 |

It is thus seen that the present invention resides in compositions comprising a polymer containing —SO$_2$— and —O— linkages connecting aromatic hydrocarbon radicals, and containing antiplasticizing material in sufficient amounts to substantially increase the stiffness of said polymer.

The invention has been described in detail with particular reference to preferred embodiments thereof, but, it will be understood that variations and modifications can be effected within the spirit and scope of the invention described hereinabove and in the appended claims.

We claim:

1. A composition comprising a polymer having the recurring unit $$-O-A-O-\langle\phantom{O}\rangle-SO_2-\langle\phantom{O}\rangle-$$

wherein A is the residue of a dihydric phenol, and con-

TABLE 2

| Poly(sulfone ether) | Antiplasticizer | | Tensile properties | | |
|---|---|---|---|---|---|
| | Name | Weight percent | Modulus, $10^5$ p.s.i. | Strength at break p.s.i. | Elongation at break percent |
| A | None | 0 | 3.4 | 9,500 | 4 |
| A | Chlorinated biphenyl with 54% chlorine | 20 | 4.4 | 11,100 | 3 |
| A | Chlorinated biphenyl with 68% chlorine | 20 | 4.1 | 10,500 | 3 |
| A | do | 40 | 4.3 | 11,800 | 3 |
| A | Chlorinated terphenyl with 42% chlorine | 20 | 4.5 | 10,900 | 3 |
| A | Poly(styrene glycol) of mol. wt. 750 | 25 | 4.3 | 10,700 | 3 |
| A | Poly(styrene thioglycol) of mol wt. 440 | 25 | 4.4 | 11,000 | 3 |
| A | Abietic acid, methyl ester | 20 | 4.4 | 10,600 | 3 |
| A | Hydroabietyl acetate | 20 | 4.1 | 10,500 | 3 |
| B | None | 0 | 3.5 | 10,000 | 5 |
| B | Chlorinated biphenyl with 54% chlorine | 20 | 4.5 | 12,100 | 3 |
| B | Chlorinated terphenyl with 42% chlorine | 20 | 4.6 | 12,300 | 3 |
| B | Chlorinated diphenylmethane with 58% chlorine. | 20 | 4.4 | 11,400 | 3 |
| B | Poly(styrene glycol) of mol. wt. 1,500 | 30 | 4.2 | 11,300 | 3 |
| B | Hydroabietyl alcohol | 25 | 4.3 | 10,900 | 3 |
| C | None | 0 | 3.6 | 10,200 | 4 |
| C | Chlorinated terphenyl with 42% chlorine | 30 | 4.5 | 12,200 | 3 |
| C | 2,4′-dinitrobiphenyl | 20 | 4.5 | 12,300 | 3 |
| C | Abietic acid, methyl ester | 20 | 4.2 | 11,030 | 3 |
| D | None | 0 | 3.4 | 9,800 | 5 |
| D | Chlorinated terphenyl with 60% chlorine | 50 | 4.4 | 11,700 | 3 |
| D | Chlorinated phenanthrene with 48% chlorine | 20 | 4.2 | 11,700 | 3 |
| D | Diabietyl adipate | 25 | 4.4 | 10,900 | 3 |
| D | 2,4-dichlorodiphenylsulfone | 20 | 4.5 | 11,100 | 3 |
| D | Poly(styrene thioglycol) of mol. wt. 1,200 | 20 | 4.1 | 10,800 | 3 |

In addition, poly(sulfone ethers) A, B, C, and D when antiplasticized by the compounds on Cols. 6 and 7 give polymer dopes which can be formed into strong, high-modulus fibers and films. High-modulus fibers of the taining from about 2–50% by weight of at least one antiplasticizing compound containing at least one polarizing constituent selected from the group consisting of halogen, oxygen, nitrogen and sulfur atoms, at least two non-bridged rings of 4–8 atoms, having in at least 65% of the length of its molecule one dimension of less than about 5.5 Angstrom units, and having a glass transition temperature greater than −50° C.

2. The composition of claim 1 wherein A is the residue of 4,4′-isopropylidenediphenol.

3. The composition of claim 1 wherein the antiplasticizer is at least one chlorinated aromatic polynuclear hydrocarbon containing from 30% to 75% nuclear chlorine.

4. The process for increasing the stiffness of a polymer having the recurring unit

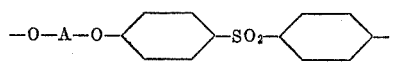

wherein A is the residue of a dihydric phenol, comprising blending therewith at least one antiplasticizing compound containing at least one polarizing constituent selected from the group consisting of halogen, oxygen, nitrogen and sulfur atoms, at least two non-bridged rings of 4–8 atoms, having in at least 65% of the length of its molecule one dimension of less than about 5.5 Angstrom units, and having a glass transition temperature greater than −50° C.

5. The composition of claim 1 wherein the antiplasticizing compound is chlorinated biphenyl.

6. The composition of claim 1 wherein the antiplasticizing compound is chlorinated terphenyl.

References Cited

UNITED STATES PATENTS

| 3,264,536 | 8/1966 | Robinson | 260—49 |
| 3,240,730 | 3/1961 | Caldwell | 260—860 |
| 2,968,639 | 1/1961 | Caldwell | 260—338 |

FOREIGN PATENTS 1,383,018  11/1964  France.

OTHER REFERENCES

C & E, Apr. 26, 1965, p. 48.

ALLAN LIEBERMAN, *Primary Examiner.*

U.S. Cl. X.R.

260—24, 33.4, 49

UNITED STATES PATENT OFFICE
CERTIFICATE OF CORRECTION

Patent No. 3,431,230                                    March 4, 1969

Winston J. Jackson, Jr., et al.

It is certified that error appears in the above identified patent and that said Letters Patent are hereby corrected as shown below:

Column 3, lines 73 to 75, cancel "increase as the glass transition temperature increases, because the polarity and thickness of the molecule become the dominant factors." and insert the same after "not" in line 2, column 4; same column 4, line 14, "GLASS TRANSMISSION TEMPERATURES" should read -- GLASS TRANSITION TEMPERATURES --; line 43, "abetic" should read -- abietic --. Column 6, line 25, "chrystalline or non-chystalline" should read -- crystalline or non-crystalline --; line 32, "out" should read -- our --.

Signed and sealed this 7th day of April 1970.

(SEAL)

Attest:

Edward M. Fletcher, Jr.

Attesting Officer

WILLIAM E. SCHUYLER, JR.

Commissioner of Patents